(12) United States Patent
Wang et al.

(10) Patent No.: US 7,411,754 B2
(45) Date of Patent: Aug. 12, 2008

(54) SYSTEM AND METHOD FOR MEASURING READBACK SIGNAL AMPLITUDE ASYMMETRY IN A PERPENDICULAR MAGNETIC RECORDING DISK DRIVE

(75) Inventors: Mike X. Wang, San Jose, CA (US); Jing Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 255 days.

(21) Appl. No.: 11/463,307

(22) Filed: Aug. 8, 2006

(65) Prior Publication Data

US 2008/0037152 A1    Feb. 14, 2008

(51) Int. Cl.
G11B 5/09    (2006.01)
(52) U.S. Cl. .......................................... 360/46; 360/31
(58) Field of Classification Search ........................ None
See application file for complete search history.

(56) References Cited

U.S. PATENT DOCUMENTS

| 4,142,215 A | | 2/1979 | Roberts |
| 5,485,320 A | | 1/1996 | Vogel et al. |
| 6,072,647 A | * | 6/2000 | Hiramatsu .................... 360/46 |
| 6,529,340 B2 | | 3/2003 | Gowda et al. |
| 2007/0195444 A1 | * | 8/2007 | Annampedu ................. 360/39 |

FOREIGN PATENT DOCUMENTS

JP    8221924    8/1996

OTHER PUBLICATIONS

Luo et al., "Experimental Study of Amplitude Asymmetry Effects in Perpendicular Recording", IEEE Transactions on Magnetics, vol. 39, No. 5, Sep. 2003, pp. 2222-2224.

* cited by examiner

*Primary Examiner*—Andrea Wellington
*Assistant Examiner*—Varsha A. Kapadia
(74) *Attorney, Agent, or Firm*—Thomas R. Berthold (57) ABSTRACT

A method for operating a tester for testing heads and disks of a magnetic recording disk drive during manufacturing calculates the readback signal amplitude asymmetry in the frequency domain without the need for measurement in the time domain with a peak detection channel. The tester first signals the write head to write a first pattern on the disk to generate a readback signal with positive pulses. The read head then detects this first recorded pattern and sends the readback signal to a spectrum analyzer connected to the tester. The tester then signals the write head to write a second pattern on the disk to generate a readback signal with negative pulses. The read head then detects this second recorded pattern and sends the readback signal to the spectrum analyzer. The spectrum analyzer measures the amplitudes of the first and second readback signals in the frequency domain using a bandpass filter. A controller in the tester calculates readback signal amplitude asymmetry from the measured amplitudes of the first and second readback signals.

13 Claims, 5 Drawing Sheets

SYSTEM AND METHOD FOR MEASURING READBACK SIGNAL AMPLITUDE ASYMMETRY IN A PERPENDICULAR MAGNETIC RECORDING DISK DRIVE

BACKGROUND OF THE INVENTION

1. Field of the Invention

This invention relates generally to magnetic recording disk drives, and more particularly to a system and method for measuring readback signal amplitude asymmetry in a perpendicular magnetic recording disk drive.

2. Description of the Related Art

Figure 1:
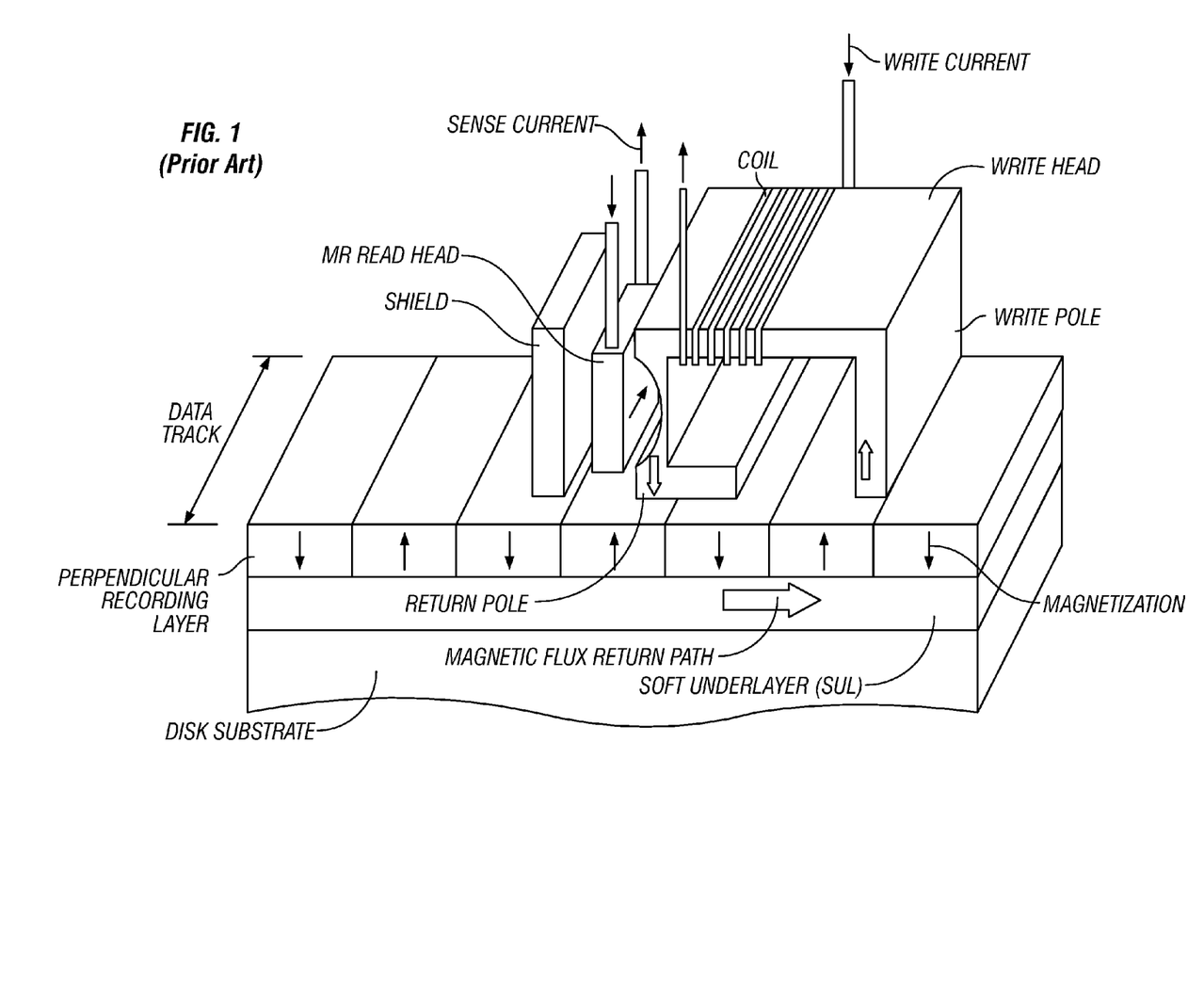
FIG. 1 is a schematic of a perpendicular magnetic recording system.

Perpendicular magnetic recording, wherein the recorded bits are stored in the generally planar recording layer in a generally perpendicular or out-of-plane orientation (i.e., other than parallel to the surfaces of the disk substrate and the recording layer), is a promising path toward ultra-high recording densities in magnetic recording hard disk drives. A common type of perpendicular magnetic recording disk drive uses a "dual-layer" disk. This type of disk drive is shown schematically in FIG. 1. Write current passes through a coil of the write head to generate a magnetic field at the write pole. The dual-layer disk includes a perpendicular magnetic data recording layer on a "soft" or relatively low-coercivity magnetically permeable underlayer (SUL) formed on the disk substrate. The SUL serves as a flux return path for the magnetic field from the write pole to the return pole of the write head. The recording layer has perpendicularly recorded magnetizations or magnetized regions that form a data track, with adjacent regions in the data track having opposite magnetization directions, as represented by the arrows. A sense current passes through the read head, typically a magnetoresistive (MR) read head, such as a tunneling MR (TMR) read head in which sense current passes perpendicularly through the layers making up the head. The magnetic transitions between adjacent oppositely-directed magnetized regions cause changes in electrical resistance that are detectable by the read head as data bits. A shield of magnetically permeable material prevents fields from magnetizations other than the magnetization being read from reaching the read head.

The read head and write head are typically formed as an integrated read/write head on an air-bearing slider. The slider is attached to an actuator arm by a suspension and positioned very close to the disk surface by the suspension. The actuator moves the slider across the disk surface so that the read/write head can access the data tracks. There are typically a stack of disks in the disk drive with a slider-suspension assembly associated with each disk surface in the stack.

In a perpendicular magnetic recording disk drive the amplitude of the readback signal from the read head is asymmetric as a natural result of the construction of the read head. It is believed that stray magnetic fields arising from the media background may also contribute to amplitude asymmetry. Readback signal amplitude asymmetry means that the amplitudes of the pulses from magnetizations recorded in one direction (e.g., the "positive" direction) are different from the amplitudes of the pulses from magnetizations recorded in the opposite direction (e.g., the "negative" direction). Thus the amplitude asymmetry (AASY) measured in percent can be expressed by the following equation:

$$AASY=[(POS-NEG)/(POS+NEG)]*100, \quad \text{Equation (1)}$$

where POS represents the measured amplitude of the pulses recorded in one direction and NEG represents the measured amplitude of the pulses recorded in the other direction.

A high value of AASY is undesirable because it is correlated with a high bit error rate (BER) when the data is read back. Thus it is important to be able to accurately measure AASY to both improve the design of the read channel to improve the BER and to determine which heads to accept for use during disk drive manufacturing.

Figure 2:
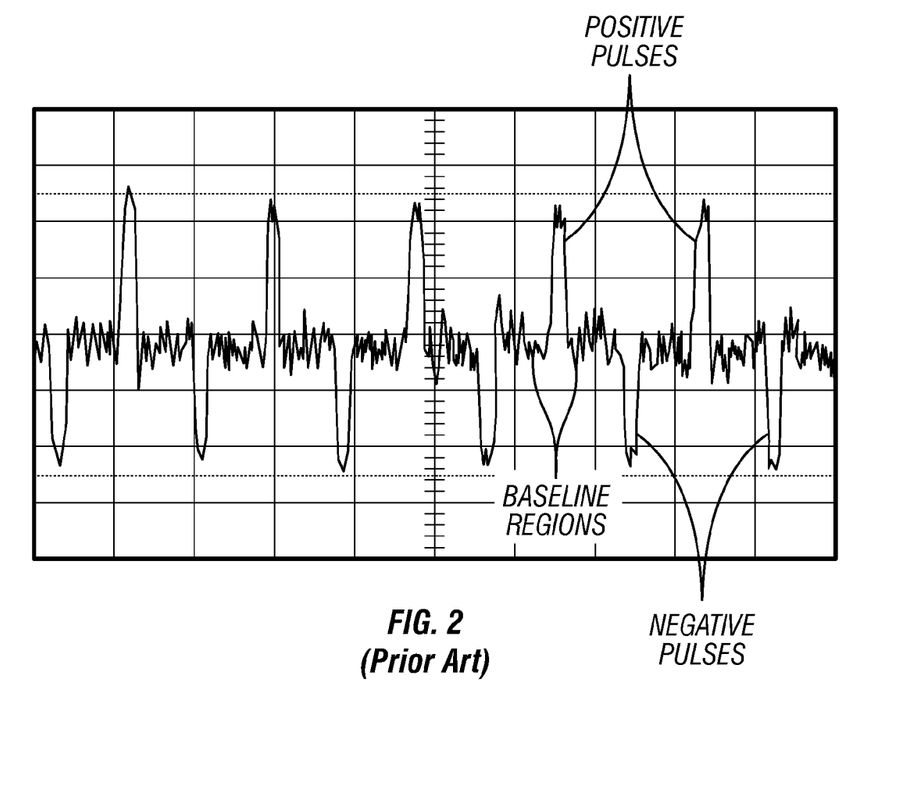
FIG. 2 is the readback signal consisting of a series of alternating isolated positive and negative pulses used to measure AASY according to the prior art peak detection time domain method.

The conventional approach for AASY measurement is with the use of a head-disk tester (also called a spin stand). Most head-disk testers include a spectrum analyzer that is used for testing many read and write head parameters, such as spectral signal-to-noise ratio (SNR) for the read head and overwrite (OW) for the write head. To measure AASY a special pattern is written on the disk to generate a readback signal of alternating isolated positive and negative pulses. The pattern is then read back by the read head. The readback signal is illustrated in FIG. 2, which shows the series of alternating isolated positive and negative pulses. The "noisy" baseline regions between the pulses that isolate the pulses is the readback signal from a high-frequency pattern of alternating positive and negative magnetizations written on the disk. However, the spectrum analyzer in the head-disk tester can not measure the amplitudes of these isolated alternating positive and negative pulses. Thus a special peak detection channel is required in the tester to measure the amplitudes of both the positive and negative readback pulses in the time domain. This peak detection channel is also used to measure other read head parameters relating to signal amplitude, such as middle-frequency track average-amplitude (MFTAA) and low-frequency track average-amplitude (LFTAA). The AASY is then calculated, according to Equation (1), from the measured amplitudes. The need for a peak detection channel increases the cost of the head-disk tester. Also, because every head must be tested, this cost is amplified because a large number of testers are required to handle the high volume of head production. This AASY measurement method also increases the overall test time for each head because the measurement with the peak detection channel must be done separately and in addition to the other measurements performed with the spectrum analyzer.

What is needed is a head-disk tester and method for accurate AASY measurement that does not require a peak detection channel and that does not require additional test time.

SUMMARY OF THE INVENTION

The invention relates to a system and method for operating a head-disk tester to calculate AASY in the frequency domain without the need for a peak detection channel. The method uses a special pattern of magnetizations that are written to the disk. The tester first signals the write head to generate a first pattern on the disk. This first pattern comprises isolated regions magnetized in a first perpendicular direction (e.g., positive), with these isolated regions being separated by baseline regions of high-frequency alternating positive and negative magnetizations. The read head then detects this first recorded pattern and sends the readback signal to a spectrum analyzer connected to the tester. The spectrum analyzer measures the amplitude of this first readback signal in the frequency domain using a bandpass filter. The tester then signals the write head to generate a second pattern on the disk. This second pattern comprises isolated regions magnetized in a second perpendicular direction (e.g., negative) opposite the first direction, with these isolated regions being separated by baseline regions of high-frequency alternating positive and negative magnetizations. The read head then detects this second recorded pattern and sends the readback signal to the spectrum analyzer. The spectrum analyzer measures the amplitude of this second readback signal. A controller in the tester calculates AASY from the measured amplitudes of the first and second readback signals. The invention includes the above-described method as well as a computer program product that comprises a computer-readable medium and computer-executable program code embodied in the computer-readable medium for enabling the tester to perform the method.

For a fuller understanding of the nature and advantages of the invention, reference should be made to the following detailed description taken together with the accompanying figures.

DETAILED DESCRIPTION OF THE INVENTION

The invention is applicable to head-disk testers, also called dynamic electrical testers (DETs), that are used in magnetic recording disk drive manufacturing to test heads and disks. A DET is sometimes also called a spin stand. Examples of head-disk testers include the Model RH-4160E DET from Hitachi DECO and the Model V2002 from Guzik Technical Enterprises.

Figure 3:
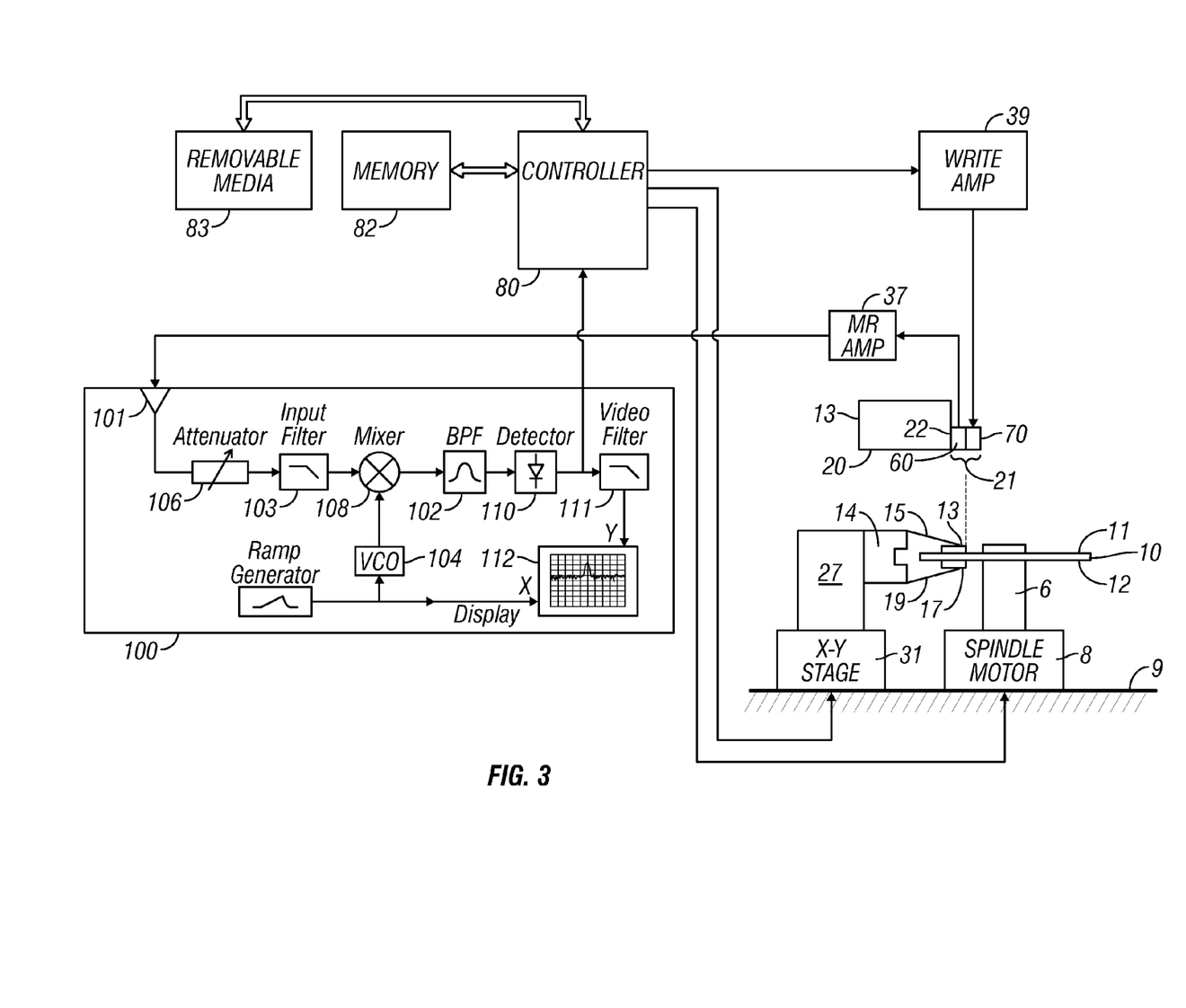
FIG. 3 is a schematic block diagram of a head-disk tester for practicing the method of this invention.

FIG. 3 is a schematic block diagram of a head-disk tester with the disk drive's slider 13 (and its read/write transducer or head 21) mounted to the tester's actuator 27, and the disk drive's magnetic recording disk 10 mounted on the tester's spindle motor 8. The recording disk 10 has surfaces 11 and 12, each of which contains a magnetic recording layer. The disk 10 is mounted on a spindle 6 and rotated by the tester's spindle motor 8 about an axis perpendicular to the disk surfaces 11, 12. The disk drive's slider 13 is attached to the tester's actuator arm 14 by means of a suspension 15 and is positioned near the surface 11 of disk 10. Slider 13 is an air-bearing slider having an air-bearing surface (ABS) 20 facing toward the disk surface 11 and a trailing end 22. The rotation of the disk 10 generates an air bearing between the ABS 20 of slider 13 and disk surface 11. During operation of the disk drive, the air bearing counterbalances the slight spring force of the suspension 15 and supports the slider 13 off and slightly away from the disk surface 11 by a small, substantially constant spacing. Slider 13 supports a read/write transducer or head 21 on its trailing end 22 for reading and writing data to the perpendicular magnetic recording layer below disk surface 11. The head 21 is a dual-element head having an inductive write element or head 70 and an MR read element or head 60. In some DETs, a second slider 17, also supporting a read/write head, is positioned on surface 12 of disk 10 and is attached to actuator arm 14 by means of suspension 19.

Actuator arm 14 is attached to actuator 27. The actuator 27 is mounted on the tester's positioning stage 31 (also called an X-Y stage). Movement of the positioning stage 31 moves the actuator 27 so that the sliders 13, 17 can be positioned to various locations on their respective disk surfaces. This enables the read/write heads to access different portions of the magnetic recording layers where data is desired to be written or read. The positioning stage 31 and the spindle motor 8 are mounted on a support base 9.

The tester includes a controller 80 that controls the operation of spindle motor 8 and positioning stage 31. Controller 80 may be a microprocessor or digital signal processor that includes logic control circuits, memory storage, and a microprocessor. The controller 80 runs a computer program that is stored in memory 82 and that embodies the logic and algorithms described further below. The memory 82 may be separate from controller 80 or as embedded memory on the controller chip. The computer program may also be implemented in microcode or other type of memory accessible to the controller 80. Computer programs on removable media (e.g., compact disc, floppy disk, portable hard drive, and flash memory) can be input to the tester and run by controller 80 through port 83. Computer-executable program code for performing the method described below is embodied in the computer-readable removable media.

Controller 80 is also connected to the write head 70. Controller 80 can thus signal the write head 70, through write amplifier 39, to cause the write head 70 to write magnetizations in the magnetic recording layer of disk surface 11 according to predetermined patterns stored in memory 82 or provided by computer program instructions.

The tester includes spectrum analyzer 100, which may be an internal spectrum analyzer incorporated into the tester, as depicted in FIG. 3, or an external commercially available spectrum analyzer. A spectrum analyzer can show, in the frequency domain, information not readily recognizable with a time domain instrument such as an oscilloscope. The input 101 of spectrum analyzer 100 is connected to MR read head 60 through MR amplifier 37. Recorded magnetizations from disk surface 10 are detected by the MR read head 60. The MR signal is amplified by amplifier 37 and input to the input 101 of spectrum analyzer 100.

The spectrum analyzer uses a bandpass filter (BPF) 102 and a sweeping voltage controlled oscillator (VCO) 104. The input power is limited by an attenuator 106 to prevent saturation. An input filter 103 removes noise from the input signal. The input signal and the VCO signal are combined through a device called a "mixer" 108. The output of mixer 108 contains various frequency components related to these two signals.

Because the VCO frequency is known, then by sending these frequency components through a narrow filter, i.e., BPF 102, both the amplitude and the frequency of the unknown input signal can be measured. An AC voltage is produced that is related to the input signal's amplitude. This AC voltage is converted to a DC voltage by an envelope detector 110, and the results are sent through a video filter 111 for display on the Y-axis of the display 112. The response is typically displayed in units of decibels referenced to a milliwatt, or dBm. The log scale (dB scale) is used because it is a good mathematical tool to cover an extremely large dynamic range. As shown in FIG. 3 the output of detector 110 is also input to the tester's controller 80 where computer programs can be implemented to perform additional calculations.

In this invention, the above-described tester is used to cause the write head 70 to generate specific patterns of magnetizations on the disk 10. The recorded magnetizations are then detected by the read head 60 and the readback signal is sent to input 101 of spectrum analyzer 100. The output from spectrum analyzer 100 is input to controller 80, which calculates AASY. The invention relies on the spectrum analyzer 100 to measure the amplitudes in the frequency domain and does not require a peak detection channel, thereby reducing the cost of the tester by approximately 10-15 percent.

However, the conventional magnetization pattern, whose readback signal is depicted in FIG. 2, can not be used with this invention because a spectrum analyzer does not have the capability to resolve positive and negative amplitudes of alternating positive and negative signals. Thus a special pattern has been developed with this invention which allows a spectrum analyzer to provide amplitude measurements that enable the controller 80 to perform the calculation of AASY without the need for a peak detection channel.

Figure 4A:
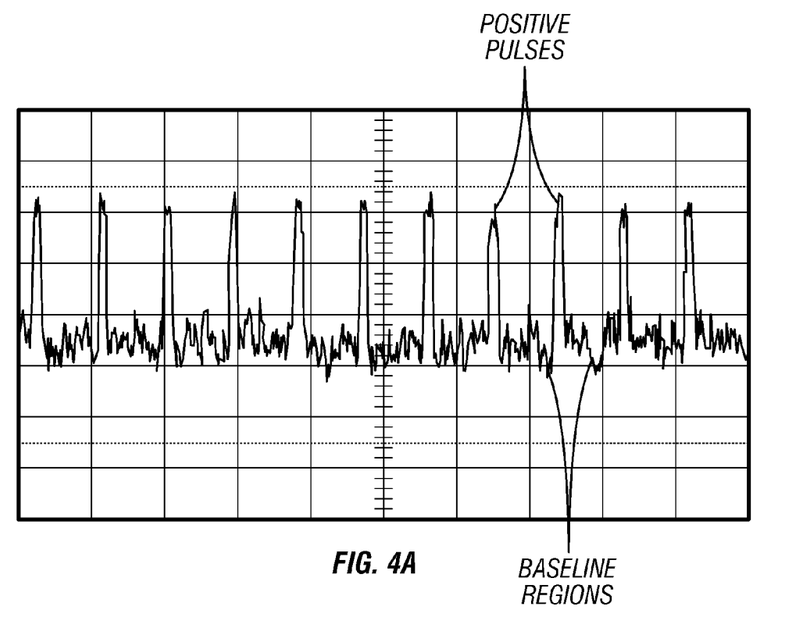
FIG. 4A is the readback signal consisting of a series of isolated positive pulses used to measure AASY according to this invention, this readback signal being the result of a first written pattern comprising regions magnetized in a "positive" perpendicular direction separated by baseline regions of high-frequency alternating positive and negative magnetizations.

In this invention the controller 80 recalls from memory 82 a computer program to generate a series of signals to write amplifier 39 to cause a first pattern of magnetizations to be recorded in a data track or tracks of the recording layer of the disk 10 to generate isolated readback pulses in a first direction (for example, positive). The controller 80 then signals the read head 60 to read back the recorded magnetizations. This readback signal is shown in FIG. 4A and represents the readback signal generated from this first pattern. This first pattern comprises isolated regions magnetized in a "positive" perpendicular direction separated by baseline regions of high-frequency alternating positive and negative magnetizations. The portions of the first pattern that generate the positive readback pulses in FIG. 4A are the result of regions in the track magnetized in the "positive" direction, while the portions of the first pattern that generate the "noisy" baseline regions in FIG. 4A between the positive pulses are the result of regions in the track with high-frequency alternating positive and negative magnetizations. By way of example, the pattern that generated the readback signal of FIG. 4A was written by writing a series of 48 consecutive alternating positive and negative "bit" regions followed by 8 consecutive positive bit regions. The readback signal is then input to the input 111 of spectrum analyzer 100 and the spectrum analyzer output to controller 80 is the amplitude of these signals.

Figure 4B:
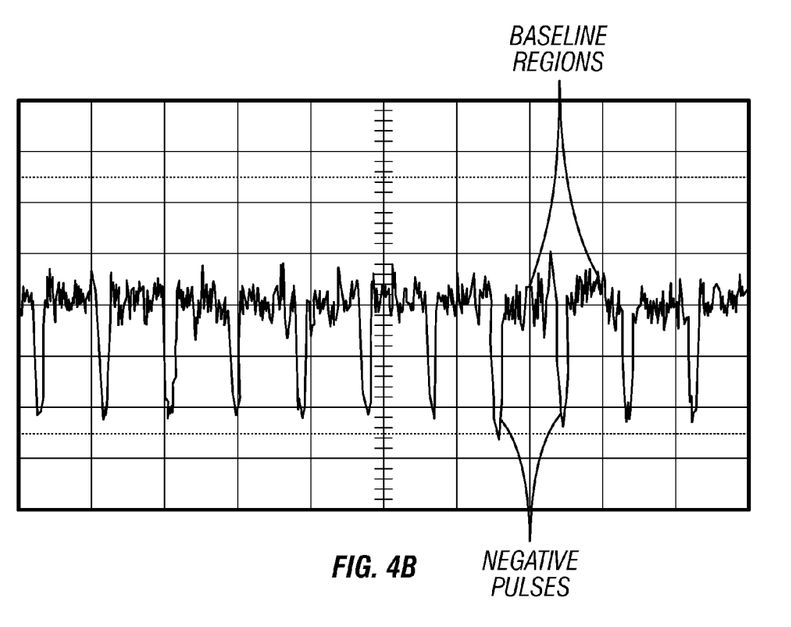
FIG. 4B is the readback signal consisting of a series of isolated negative pulses used to measure AASY according to this invention, this readback signal being the result of a second written pattern comprising regions magnetized in a "negative" perpendicular direction separated by baseline regions of high-frequency alternating positive and negative magnetizations.

Next, the controller 80 recalls from memory 82 a computer program to generate a series of signals to write amplifier 39 to cause a second pattern of magnetizations to be recorded in a data track or tracks of the recording layer of the disk 10 to generate readback pulses in a second direction (for example, negative) opposite to said first direction. The controller 80 then signals the read head 60 to read back the recorded magnetizations. This readback signal is shown in FIG. 4B and represents the readback signal generated from this second written pattern. This second pattern comprises isolated regions magnetized in a "negative" perpendicular direction separated by baseline regions of high-frequency alternating positive and negative magnetizations. The portions of the first pattern that generate the negative readback pulses in FIG. 4B are the result of regions in the track magnetized in the "negative" direction, while the portions of the first pattern that generate the "noisy" baseline regions in FIG. 4B between the negative pulses are the result of regions in the track with high-frequency alternating positive and negative magnetizations. The readback signal is then input to the input 111 of spectrum analyzer 100 and the spectrum analyzer output to controller 80 is the amplitude of these signals. The controller 80 then uses the measured positive and negative amplitudes to calculate AASY according to Equation (1).

Figure 5:
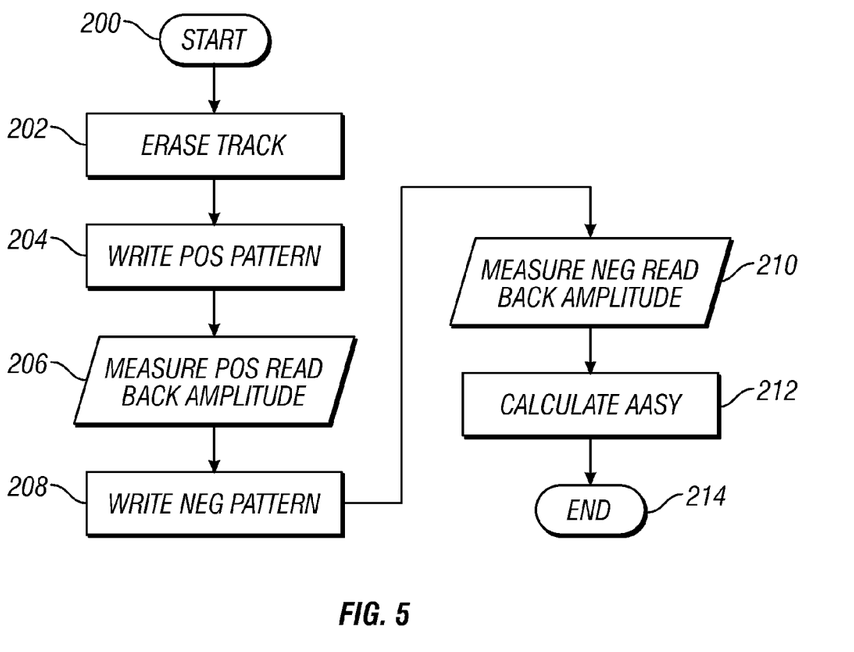
FIG. 5 is a flow chart showing the method of this invention.

The method is shown by the flow chart of FIG. 5. After start (block 200) the controller 80 signals write head 70 to erase a track or multiple tracks (block 202). The first pattern is then written (block 204) and the positive amplitudes measured (206). Then the second pattern is written (block 208) and the negative amplitudes measured (block 210). The AASY is then calculated (block 212) to end the method (block 214). While in the preferred method the magnetizations are recorded in the first direction (block 204) and then the amplitudes of the pulses in the first readback signal are measured (block 206), the two patterns can be written in succession and then the two measurements made. If the two patterns are written in succession, each pattern would be written on less than one-half of a track to prevent the second pattern from overwriting the first pattern. Thus, block 208 could occur after block 204 and before block 206.

In a typical example for calculating AASY according to the method of this invention, the patterns were written on the track to cause magnetizations at a linear density of approximately 20K bits per inch (bpi) at a disk rotational speed of 5400 RPM. Each pattern was a series of 48 consecutive alternating positive and negative bits followed by 8 consecutive positive bits (for the first pattern) or negative bits (for the second pattern). The bandpass filter 102 of spectrum analyzer 100 was set to a center frequency of 11.07 MHz with 30 kHz resolution bandwidth.

Figure 6:
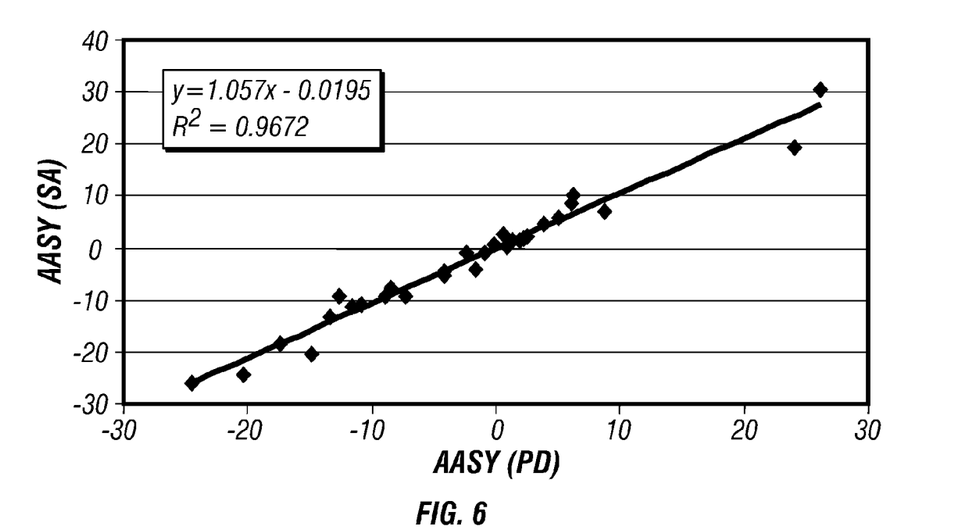
FIG. 6 shows data points and a linear curve fit correlating AASY measured according to the frequency domain method of this invention (AASY(SA) on the Y-axis) with the AASY measured according to the prior art peak-detection time domain method (AASY(PD) on the X-axis).

FIG. 6 shows data points and a linear curve fit for correlating AASY calculated according to the frequency domain method of this invention (AASY(SA) on the Y-axis) with the AASY calculated according to the prior art peak-detection time domain method (AASY(PD) on the X-axis). The linear curve fit shows good correlation from $R^2=0.9672$, which is a measure of correlation quality.

In addition to cost savings by the elimination of a separate peak detection channel, the invention substantially reduces the overall test time because the AASY measurement, as well as other read parameter measurements, such as MFTAA and LFTAA, do not need to be done separately, as would be required with a separate peak detection channel. This is because these other read head parameters can be obtained as intermediate results from measurement of other parameters by the spectrum analyzer. For example, MFTAA can be obtained as the intermediate result from the spectrum analyzer measurement of spectral SNR and LFTAA can be obtained as the intermediate result from spectrum analyzer measurement of OW.

While the invention has been described for AASY measurement in perpendicular magnetic recording disk drives, the invention is also fully applicable for AASY measurement in the more conventional horizontal or longitudinal magnetic recording disk drives. In horizontal recording the regions of the recording layer are magnetized in the plane of the recording layer. The patterns written in the horizontal media would thus differ from the written patterns described above, but would still generate the same type of readback signals.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for measuring the amplitude asymmetry of a signal from a read head detecting magnetizations in a magnetic recording layer of a magnetic recording disk, the method comprising:
   writing a first series of magnetizations in the magnetic recording layer to generate readback pulses having a positive amplitude;
   writing a second series of consecutive magnetizations in the magnetic recording layer to generate readback pulses having a negative amplitude;
   detecting with the read head the first series of magnetizations to generate a first readback signal;
   detecting with the read head the second series of magnetizations to generate a second readback signal;
   measuring in the frequency domain the amplitude of the pulses in said first readback signal;
   measuring in the frequency domain the amplitude of the pulses in said second readback signal; and
   calculating from said measured amplitudes the asymmetry between the first readback signal amplitude and the second readback signal amplitude.

2. The method of claim 1 wherein detecting the first series of magnetizations and measuring in the frequency domain the amplitude of the pulses in said first readback signal are performed before writing the second series of magnetizations.

3. The method of claim 1 wherein measuring in the frequency domain the amplitude of the pulses in each of said first and second readback signals comprises measuring with a spectrum analyzer having an oscillator, a mixer and a bandpass filter, the spectrum analyzer measuring comprising mixing the readback signal with the oscillator signal, passing the mixed signal through the bandpass filter, and measuring a voltage of the signal output from the bandpass filter.

4. The method of claim 1 wherein calculating the amplitude asymmetry comprises calculating the amplitude asymmetry percentage (AASY) according to the equation

AASY=[(POS−NEG)/(POS+NEG)]*100, wherein POS represents the measured amplitude of the pulses in one of said first and second readback signals, and NEG represents the measured amplitude of the pulses in the other of said first and second readback signals.

5. The method of claim 1 wherein the magnetic recording layer is a perpendicular magnetic recording layer, wherein writing said first series of magnetizations comprises writing isolated regions magnetized in a first generally perpendicular direction, and wherein writing said second series of magnetizations comprises writing isolated regions magnetized in a second direction generally opposite said first direction.

6. The method of claim 5 wherein writing said first series of magnetizations further comprises writing alternating first-direction and second-direction magnetizations between said isolated first-direction regions to form baseline regions, and wherein writing said second series of magnetizations further comprises writing alternating first-direction and second-direction magnetizations between said isolated second-direction regions to form baseline regions.

7. A method of operating a head-disk tester having a spectrum analyzer, a processor, and memory accessible by the processor, the tester being capable of supporting a rotatable perpendicular magnetic recording disk and a read/write head for writing magnetizations generally perpendicularly on the disk and reading written magnetizations from the disk, the processor-implemented method comprising:
   generating a signal to the head to cause the head to write a first pattern on the disk, said first pattern comprising a series of isolated regions magnetized in a first direction and separated by baseline regions of alternating first-direction and second-direction magnetizations, said second direction being generally opposite to said first direction;
   generating a signal to the head to cause the head to write a second pattern on the disk, said second pattern comprising a series of isolated regions magnetized in said second direction and separated by baseline regions of alternating first-direction and second-direction magnetizations;
   directing the head to read said first pattern to generate a first readback signal;
   directing the head to read said second pattern to generate a second readback signal;
   measuring with the spectrum analyzer the amplitude of the pulses in said first readback signal;
   measuring with the spectrum analyzer the amplitude of the pulses in said second readback signal; and
   calculating from said measured amplitudes the asymmetry between the first readback signal amplitude and the second readback signal amplitude.

8. The method of claim 7 wherein directing the head to read said first pattern and measuring with the spectrum analyzer the amplitude of the pulses in said first readback signal are performed before generating a signal to the head to cause the head to write the second pattern.

9. The method of claim 7 wherein the spectrum analyzer includes an oscillator, a mixer, a bandpass filter, and a voltage detector, and wherein measuring the amplitude of the pulses in the readback signal with the spectrum analyzer comprises mixing the readback signal with the oscillator signal, passing the mixed signal through the bandpass filter, and detecting a voltage of the signal output from the bandpass filter.

10. The method of claim 9 wherein calculating the amplitude asymmetry comprises calculating the asymmetry from a first voltage output from the first readback signal and a second voltage output from the second readback signal.

11. The method of claim 7 wherein calculating the amplitude asymmetry comprises calculating the amplitude asymmetry percentage (ASY %) according to the equation

AASY=[(POS−NEG)/(POS+NEG)]*100, wherein POS represents the measured amplitude of the pulses in one of said first and second readback signals, and NEG represents the measured amplitude of the pulses in the other of said first and second readback signals.

12. A computer program product for operating a head-disk tester capable of supporting a magnetic recording disk and adapted for connection to a write head for writing magnetizations on the disk and to a read head for detecting magnetizations from the disk, the computer program product comprising:
   a computer-readable medium; and
   computer-executable program code embodied in the computer-readable medium for
      signaling the write head to write a series of isolated regions magnetized in a first direction;
      signaling the write head to write a series of isolated regions magnetized in a second direction generally opposite said first direction;

detecting a first readback signal from the read head representing the regions magnetized in said first direction;
detecting a second readback signal from the read head representing the regions magnetized in said second direction;
measuring in the frequency domain the amplitude of the first readback signal;
measuring in the frequency domain the amplitude of the second readback signal; and
calculating from said measured amplitudes the asymmetry between the first readback signal amplitude and the second readback signal amplitude.

13. The computer program product of claim 12 wherein the computer-executable program code further comprises:
signaling the write head to write alternating first-direction and second-direction magnetizations between said isolated first-direction regions to form baseline regions; and
signaling the write head to write alternating first-direction and second-direction magnetizations between said isolated second-direction regions to form baseline regions.

* * * * *